INVENTOR.
BENJAMIN KAZAN
BY
Ronald Zibelli
ATTORNEY

April 8, 1969 B. KAZAN 3,437,408

MULTIPLE COPY ELECTROSTATIC IMAGING APPARATUS

Filed Sept. 29, 1966 Sheet 2 of 2

INVENTOR.
BENJAMIN KAZAN

BY Ronald Zibelli

ATTORNEY

United States Patent Office 3,437,408

Patented Apr. 8, 1969

3,437,408

MULTIPLE COPY ELECTROSTATIC IMAGING APPARATUS

Benjamin Kazan, Pasadena, Calif., assignor to Xerox Corporation, Rochester, N.Y., a corporation of New York Filed Sept. 29, 1966, Ser. No. 582,909
Int. Cl. G03g *15/00;* H01l *15/00*
U.S. Cl. 355—3 8 Claims This invention relates generally to imaging apparatus and more specifically to apparatus of the type adapted to produce a corresponding electrostatic output in response to an optical or optically analogous input presented thereto.

Numerous member species have been described or otherwise set forth in the literature relating to a class of devices generically identifiable under the term "image convertors." The type of devices to which we allude in the present context are usually "converting" in the sense that optical images presented thereto are transduced into corresponding utilizable electrostatic outputs. Devices of this type for example are shown in U.S. Patents 3,185,999 and 3,186,839. In both of these cited instances a plurality of photoconductive elements are utilized to vary the electrical outputs obtainable from an associated plurality of pin electrodes: thus an optical image may be projected upon the various photoconductive elements and effect direct and corresponding variations at the output electrodes.

While devices of the type alluded to do exhibit the ability to transduce a provided optical input to a corresponding electrostatic output, they do not possess any degree of storageability for the input image, and as a result they merely act as a conduit—in the sense that the corresponding electrostatic output may only be produced while the optical input is simultaneously maintained. Because of this limitation multiple output copies of original images can only be produced by continuing application of an optical input to the device for so long as the corresponding output is desired. This requirement tends to limit the usefulness of the device, in that it necessitates a continuing cooperative relationship between the transducer and an optical system, which in turn demands continuous heat-producing illuminaion upon the source of the original images, and so forth. The prior art does not accordingly define devices which in any simple mode of operation may be utilized in producing multiple electrostatic output images corresponding to a single optical or optically analogous input previously provided. Beyond this, since the prior art generally takes the approach of direct transduction from optical to electrostatic image, it does not recognize the possible usefulness of being able to reproduce multiple electrostatic images from an original electrostatic image without the intermediate use of optical means.

Now in accordance with the present invention, however, I have devised image converting apparatus that is not only suitable for producing multiple electrostatic outputs after but a single optical input is provided, but is in addition adapted to a usage wherein the input need not necessarily be optical in form but may itself constitute a latent electrostatic image.

It may be thus regarded as an object of the present invention to provide imaging apparatus for producing an electrostatic image output corresponding to an optical or electrostatic image pattern input provided thereto.

It is another object of the present invention to provide apparatus whereby multiple electrostatic output images may be created after but a single optical or electrostatic input has been supplied thereto.

It is a further object of the present invention to provide image conversion apparatus for transducing optical images to electrostatic images in which storageability for the optical input is achieved in an exceedingly simple manner.

It is a yet further object of the present invention to provide a multiple copy device adapted to receive a latent electrostatic image on an input surface thereof and produce multiple corresponding electrostatic images at an output surface, without substantially dissipating the stored input image.

In accordance with the present invention these explicit objects and others not explicitly indicated, are achieved by use of a structure wherein a semiconductor field-effect layer is utilized to control the electrical potential of individual elements in a matrix of conductive pins. It is characteristic of such field-effect layers in general that the conductivity of volumes thereof may be made to vary by application of an electric field. While—as will be shown—any field-effect layer may be utilized in the present invention, an instructive exemplary embodiment of the invention may be considered wherein a field-effect layer is utilized which additionally is further adapted to retain charge deposited on the surface thereof and to dissipate portions of such charge in response to impinging light. Materials satisfying this totality of requirements will be referred to in the course of this specification as "storing semiconductors" and further details concerning such materials will be given in the ensuing paragraphs.

In the exemplary embodiment an image input surface is provided comprising paired adjacent areas, with the first member, of each of the pairs being formed from a layer of such storing semiconductor material, and with the second member of each of the pairs being formed from a material displaying fixed resistance properties. By charging the surface and subsequently projecting an optical input thereon a charge pattern may be established on the totality of the first member areas in accord with the optical input. The image-configurated charge pattern serves as a source for an electric field which in turn effects corresponding conductivity variations in volumes of the semiconductor underlying the first member areas. Individual pins of the alluded-to-matrix are electrically connected to the boundaries between paired areas. Accordingly, when an electrical potential is established between members of a paired area, an individual pin at the boundary therebetween appears electrically at the division point of a voltage divider circuit including in series connection a conductivity channel in the second member area displaying a fixed conductivity and a conductivity channel in the first member area displaying conductivity in accord with the amount of charge overlying such second area. Accordingly the electrical potential of individual of the various pins will vary in accord with the conductivity underlying first member areas which in turn will be in accord with the charge distribution thereon—and thus with the optical input originally provided the apparatus.

A fuller understanding of the present invention, of its mode of operation, and of the manner in which it achieves the objects previously indicated may now best be gained by a reading of the following detailed specification and by a simultaneous examination of the drawings appended hereto in which:

FIGURE 1 diagrammatically illustrates a basic embodiment of the present invention.

Figure 5:
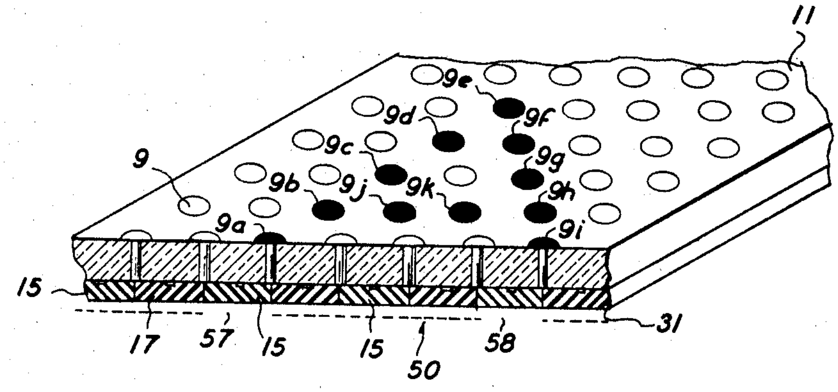

FIGURE 5 diagrammatically illustrates the manner in which apparatus according to the present invention is utilized to produce multiple output copies.

Figure 1:
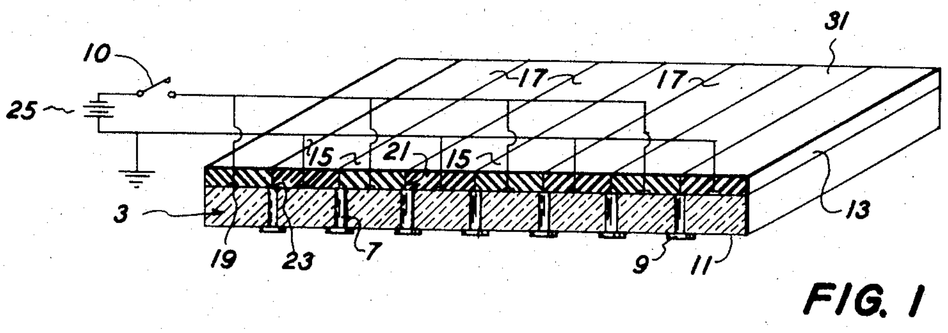
Figure 7:
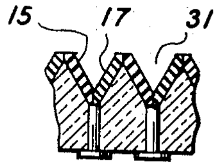
Figure 6:
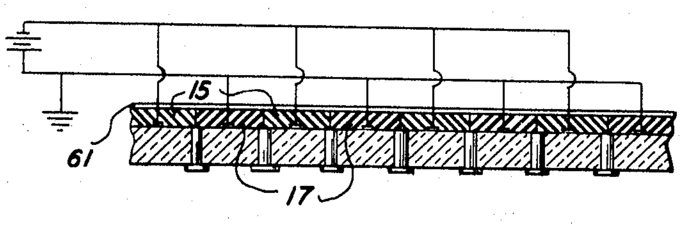

FIGURE 6 shows a form of the present apparatus particularly adapted to use with a non-optical input; and FIGURE 7 graphically depicts a modification of the FIGURE 1 apparatus.

In FIGURE 1 a basic embodiment of the present invention is depicted. In that figure a plate 3 appears, which serves primarily an insulating and support function. Any good insulator displaying reasonable rigidity may be used for plate 3, including, for example, glass. Embedded in plate 3 at regular intervals are a series of conductive pins; the regular spacing of such elements effectively establishes a matrix of such conductive elements and we may accordingly in the course of the present specification refer at times to the collective structure as a "pin matrix." Each individual pin—such as pin 7—protrudes slightly from the insulating plate 3 at both planar surfaces 11 and 13 thereof, and at the bottom surface 11 which will in practice be the output side of the device—an individual pin 7 will be flared out into or otherwise secured to an end portion 9. End portion 9 will actually constitute the depositing electrode structure when the apparatus is utilized in electrostatic imaging processes, and where such element is other than integral with pin 7 may be formed of a small metal or other conductive material disk which is conductively attached to the end of pin 7 by any joining technique known in the art. While the depiction of FIGURE 1 shows only a very limited number of pin elements it will be understood that in practice the structure depicted may extend dimensionally to any degree desirable. Additionally, it will be appreciated that the scale of FIGURE 1 is greatly exaggerated for purposes of clarity: in actual practice the distance between pin centers will be only of the order of mils. Similarly the diameter of end portions 9 will be very slight as in subsequent use the portions 9 will individually deposit but single dot elements in an overall image.

On the opposite face 13 of insulating plate 3 a series of variable resistance strips 15 and alternating fixed resistance strips 17 are directly deposited. In the embodiment depicted in FIGURE 1 it is assumed that the two sets of strips are of different materials. The strips 17 will commonly comprise an easily deposited material of uniform resistive properties. The strips may, for example, comprise vacuum-deposited layers of silicon dioxide which generally will be deposited to a depth of less than 1 mil. Alternating with these fixed resistance strips 17 are variable resistance strips 15 comprised of such semiconductor materials that each such strip constitutes a field-effect layer of a type subsequently to be indicated.

The term "field-effect layer" in the present specification is intended to signify a semiconductor layer of the type displaying conductivity variations in response to an electric field imposed thereon. A large number of semiconductor materials are known which exhibit the specified characteristics and an extensive list may be found, for example, at page 9 of Field Effect Transistors edited by Wallmark and Johnson, Prentice Hall, Inc., Englewood Cliffs, New Jersey (1966). In the practice of the present invention and as will shortly become apparent a latent electrostatic image will be formed upon the surface overlying such strips 15, this latent electrostatic image thereafter serving as the source for the aforementioned electric field. In order to form the latent electrostatic image at the surface indicated, the semiconductor material comprising the field-effect layer, may itself be chosen to possess substantial photoconductivity or alternatively a more highly photoconductive material may be bonded to the semiconductor layer and the latter element may then constitute the situs for the latent electrostatic image. Of those semiconductor materials which exhibit the required field-effect response and are also substantially photoconductive, there exists a subclass of materials particularly suitable for use as a field-effect layer in the FIGURE 1 embodiment of present invention. This subclass of materials will hereinafter be referred to as "storing semiconductors," the term serving to define semiconductor materials adapted to retain electrostatic charge on the surface thereof, to conduct current through the central portion thereof without substantially dissipating such charge, and to dissipate such charge in response to impinging radiation. Zinc oxide is the best known example of the materials in the defined subclass; however in addition to zince oxide there are other materials such as lead oxide and cadmium oxide which exhibit similar characteristics.

For purposes of positively illustrating the FIGURE 1 depiction it may be then considered that the strips 15 are not compound in nature, but rather comprises a uniform layer of the storing semiconductor zinc oxide. The zinc oxide may be deposited in any convenient manner. A layer of the order of a few mils thickness and contained in a relatively transparent binder for example may be directly spray-coated upon insulating plate 3 from a composition similar to that utilized in preparing zinc oxide-coated electrostatic copying papers. A table setting forth an appropriate composition is given below:

| Material: | Pounds per 100 gallons |
|---|---|
| Zinc Oxide | 533.000 |
| Pliolite C–5D[1] | 107.000 |
| Chlorinated paraffin | 27.000 |
| Toluene | 533.000 |
| Bromophenol Blue | 0.021 |
| Methyl Green | 0.016 |
| Acridine Orange | 0.016 |
| | 1200.053 |

[1] Pliolite S–5D is a styrene butadiene copolymer produced by the Chemical Division of the Goodyear Tire and Rubber Co., Akron, Ohio. A detailed discussion of the aforementioned zinc oxide composition is set forth in the publication titled "Tech-Book Facts," Formulations PLS–37, Chemical Division Goodyear Tire and Rubber Co., Akron, Ohio.

Layers below 1 mil are also useful in the invention and may be obtained by thin film techniques such as sputtering of elemental zinc in an oxygen atmosphere. Similarly, other well-known thin film techniques may be utilized to obtain zinc oxide layers in the micron range of thickness: for example elemental zinc may be vacuum deposited onto plate 3, and the latter subsequently heated to convert the elemental zinc to the oxide form. It may be noted that these thin film techniques result in a layer which—unlike the sprayed layer—is devoid of binder. Generally speaking this feature is advantageous in that the superior electron mobility present under such circumstances results in more uniform electric properties in the layer.

Prior to the deposition of the variable resistance strips 15 and fixed resistance strips 17 a series of fine parallel conductive lines 19, such as for example, gold, are vacuum-deposited upon insulating plate 3. FIGURE 1 shows that the lateral spacing of these lines 19 is such as to place each line at the approximate lateral midpoint of each variable or fixed resistance strip. It is also seen in FIGURE 1 that the pattern of depositing the various strips is such as to place the boundary 21 of adjacent strips at percisely the point at which a conductive pin 7 protrudes from the uppermost face 13 of insulating plate 3. The manner in which the strips 15 and 17 are deposited is such as to assure a relatively low resistance contact at their mutual boundary 21 and to the conducting pin 7 at the common point 23.

Figure 3:
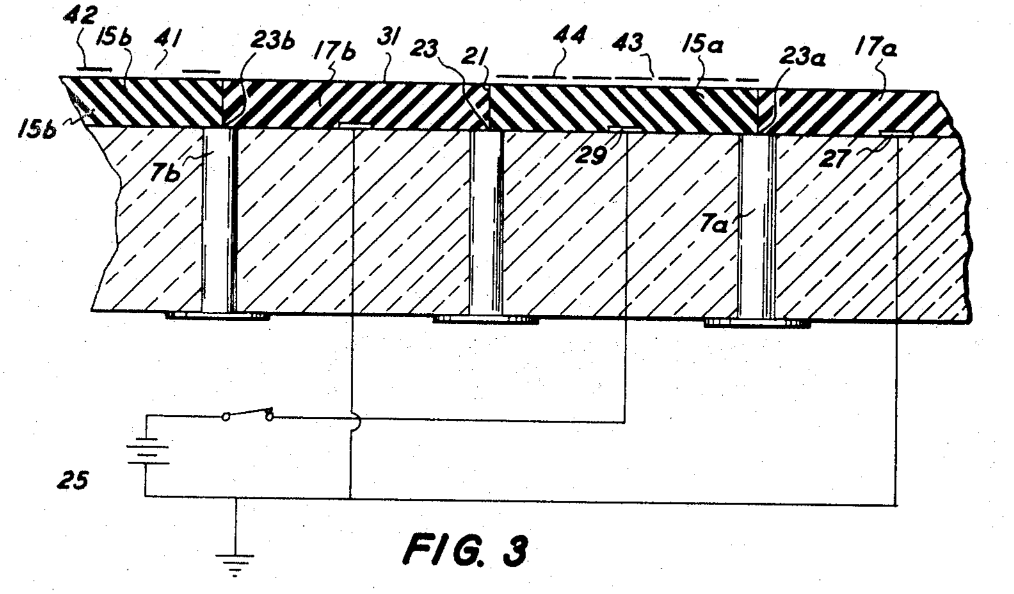
FIGURE 3 depicts a portion of the FIGURE 1 apparatus on a further magnified scale.

FIGURE 3 shows on an enlarged scale a portion of the FIGURE 1 apparatus.

Figure 4:
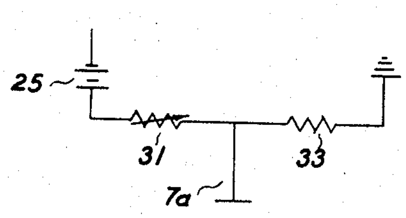
FIGURE 4 is a schematic diagram representing the electrical equivalent circuit present in apparatus according to the present invention.

In the use of the apparatus for imaging purposes a potential difference will be established between adjacent parallel conductive lines 27 and 29 by application thereto of an electrical potential as from the source 25. Under such conditions a given pin *7a* will appear—in the electrical sense—at the division point of a voltage divider circuit which includes a fixed resistance conductivity channel in that portion of strip 15*a* lying between pin *7a* and conductive line 27 and a series-connected variable resistance channel in that portion of strip 17 lying between pin *7a* and conductive line 29. This electrical state of affairs is more clearly shown in FIGURE 4 depicting the electrical equivalent circuit for the described action. The variable resistance channel alluded to is here shown as resistance 31; the fixed resistance channel as resistance 33. As indicated the pin *7a* appears at the division point thereof.

The manner in which the apparatus of FIGURE 1 functions to produce an electrostatic output corresponding to an optical input presented thereto, may now be directly set forth. More specifically, it will be appreciated that the variable conductivity channels referred to in the previous paragraph are established between elements of the pin matrix and adjacent conductive lines 19 in response to an image-configurated electric field imposed upon the variable resistance strip elements 15. Assuming, as we have for FIGURE 1, that the strips 15 comprise the zinc oxide material indicated, the required field is established via a direct optical technique. Initially, a uniform negative charge pattern is deposited upon the entire upper surface 31 of the apparatus. The surface 31 is thereafter exposed to a projected light pattern of the image the reproduction of which is desired. Carriers generated within the zinc oxide comprising the elements 15 selectively dissipate charge at the surface thereof in accordance with impinging light intensity. During this phase of the operation a ground plane assisting charge dissipation may be conveniently established by supporting the entire structure on a conductive grounded surface so that contact between the pin end portions 9 and the surface is present. To avoid excessive current flow switch 10 is placed in an open condition. The light source is then cut off whereupon a charge pattern remains upon the strips in accord with the optical image previously projected. This charge pattern serves as the source for an image-configurated electric field. Since as has been previously indicated the zinc oxide comprising elements 15 is a storing semiconductor, the conductivity of the volumes of the layer underlying the surface thereof will thus vary in accord with the charge pattern. In electrical terms the resistance 31 in FIGURE 4 will therefore vary for individual pins in accord with the charge overlying the path between such pins and conductive lines as at 29. As a result the potential appearing at conducting end portions 9 will also vary from element to element in the pin matrix in accord with the retained charge pattern.

A somewhat more detailed showing of the mechanism by which the variations in the potential applied to the several conducting pins is brought is shown in the magnified scale of FIGURE 3. In that figure two pins *7a* and *7b* are shown, both members of the generalized pin matrix. As previously indicated it is assumed that the surface 31 has been previously subjected to uniform negative charging as by exposure to a negative corona source or the like. Thereafter a light image was projected upon the surface 31 the image being of such form that substantial light intensity impinged upon the area 41 of the overlying strip 15*b* which bounds pin *7b* with light of much lesser intensity being incident upon the area 43 overlying the strip 15*a* which bounds pin *7a*. The consequence of the variable light application is such as to diminish the negative charges at the surface 41 while scarcely affecting the charge density over surface 43. This variation in available surface charge is suggested in FIGURE 3 by the dissimilarity in the number of negative signs depicted at 42 and 44 respectively. The electric fields established by the presence of the negative charge overlying the surfaces 41 and 43 repells conductor electrons within the body of the n-type semiconductor (zinc oxide) below. The intensity of the field at a given point will determine the diminution of conductivity in underlying semiconductor and such field intensity will in turn be proportional to the number of negative charges appearing at the overlying surface. Thus it is that the conductivity between point 23*a* and conductive line 29 on the one hand, or between point 23*b* and conductive line 20 on the other, varies in accord with the charge overlying the areas 43 and 41 respectively. The varying conductivity referred to is, of course, resistance 31 in the schematic equivalent circuit of FIGURE 4, and it follows that the potential of the pins *7a* and *7b*—each contained in equivalent circuits of the type depicted in that figure—will reflect the specific values of resistance 31 once switch 10 is closed.

Once the charge pattern has been established in the manner set forth, the FIGURE 1 apparatus may be utilized to produce multiple output copies or the like corresponding to the charge pattern. In FIGURE 5 an isometric, partially sectioned view is shown depicting the apparatus of FIGURE 1, but inverted from its FIGURE 1 position. The isometric showing clearly depicts the plurality of pin end portions 9 as forming in their totality a matrix-like structure. The electrical connections to the alternating strips 15 and 17 are for simplicity not shown but are identical to that in FIGURE 1 except that switch 10 is now in a closed position. A latent charge pattern 50 is present at the surface 31 formed by the strips 15 and 17. Where the composition of the various strips 15 and 17 is as has been described in connection with FIGURE 1, the charge pattern 50 is formed by initially depositing a uniform layer of negative charge—as from a corona source or the like—and thereafter exposing the charged surface 31 to an optical pattern representative of intelligence to be reproduced. Thus, in FIGURE 5 it may be assumed that a light pattern including bright portions representative of the letter A has been projected upon the previously charged surface and as a result charge has been diminished in portions of that surface such as areas 57 and 58. It should perhaps be noted at this point that such charge can only be dissipated over the strips 15 which exhibit photoconductive properties, the strips 17 being unaffected by light impinging thereon. This of course implies that the charge pattern formed upon surface 31 of the present device will necessarily be rastered, that is to say that dissipation of charge can only take place on the alternating strips 15. This is not considered to be a limitation of any consequence, however, in that the ultimate printout utilizes a pin matrix which is not in any event continuous; thus any resolution that may be lost by rastering the controlling latent charge image will be no greater than the diminution of resolution imposed by the pins themselves. It should also be mentioned in connection with the same subject that as has been previously indicated the scale of FIGURES 1—and 5 as well—is greatly exaggerated; in reality the various pins and in particular the end portions 9 are extremely close together.

Under the control of latent charge image 50 potential variations are brought about in the various pin elements precisely in accord with the latent electrostatic image. Assuming then that the variable conductivity strips 15 comprise the zinc oxide composition previously indicated, the effect of partially discharging areas such as 57 and 58 overlying such strips will be to increase the potential of pins associated therewith such as pins 51 and 56. This is so because wherever such negative charge has been partially dissipated the conductivity of the underlying material is raised, implying in turn that the resistance 31 in FIGURE 4 is diminished, whereby a greater proportion of the potential from source 25 in that figure is present at pin *7a* then would previously be the case.

Assuming that the impingment of light is in the pattern suggested, that is, in the form of an A pins in the matrix are affected such that their end portions 9_a_ through 9_i_ form the same A. In order to produce a visible image it is now only necessary to dust the surface 11 with xerographic toner particles or the like which will selectively adhere to the areas of high electrical potential and thus outline the image—such as the letter A shown in the figure. In a typical instance the image is then transferred to a dielectric sheet, a piece of paper, or the like by placing the receiving sheet in contact with the face 11 and applying a potential to the back side of the sheet by for example enveloping such back surface with a corona discharge. Any other convenient techniques known in the art of xerography may similarly be employed to transfer the developed image from the surface 11 to a transfer member; so for example the transfer member may be provided with an adhesive surface, whereby transfer of the developed image may be effected by pressure contact with the powder image. Alternatively, of course, it will be obvious that the image rendered visible by application of toner to face 11 may be viewed directly without effecting any transfer whatsoever.

Regardless of what techniques are employed to visualize and/or utilize the electrostatic pattern present at the pin matrix, such electrostatic pattern will yet remain at the pin matrix for so long as the controlling charge pattern 50 is present at surface 11. Thus the surface 11 bearing the pin matrix may be developed with toner or the like an indefinite number of times, and accordingly an indefinite number of outputs may be obtained—for example in the form of transferred toner images—without in any way dissipating or otherwise affecting the latent charge pattern.

So far the present apparatus has been particularly described in terms of an embodiment wherein the alternating strips 15 and 17 as in FIGURE 1 comprise distinctly different materials. The present apparatus may, however, be readily constructed so that the alternating fixed conductance and variable conductance paired areas are portions of the same integral layer. Thus in FIGURE 2 the plate 3 is shown with a single zinc ovide layer 45 adherent thereto. In this case the paired areas corresponding to strips 15 and 17 in FIGURE 1 are created by merely applying light occluding strips 41, 42, 43, and so forth to alternating strip-like elemental portions of the layer 45. The light occluding strips are deposited of a material which is highly occluding to impinging light and preferably is as well highly insulating. In the simplest case strips of common electrical insulating tape may be utilized of the type incorporating a plastic or rubber base support to which a layer of adhesive is applied. These tapes are commonly of a dense black color and so exhibit the required light-occluding properties. Other materials can be utilized as well, for example low-melting point plastics like Bakelite (phenoformaldehyde) to which suitable light absorbing dyes have been added.

Figure 2:
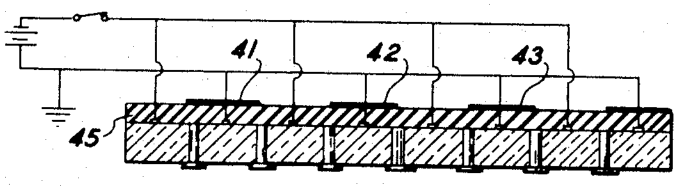
FIGURE 2 illustrates a form of the FIGURE 1 apparatus in which the field-effect layer is deposited as a unit with subsequent light occlusion of designated areas being employed to achieve the required pairing.

When the FIGURE 2 embodiment is utilized in the manner described in connection with FIGURE 5, the initial step of depositing a uniform layer of charge upon the surface 11 will place such uniform charge over the entire layer 45 including the occluded, insulated portions. Subsequent projection of a light pattern upon the layer 45 will establish a latent charge image upon the non-occluded portions of the layer. The occluded portions however will be entirely unaffected and the prior deposited charge will remain intact on such areas. The net effect of such remaining charge is to cause the volumes of semiconductor material underlying these latter areas to exhibit conductivities which are essentially unvarying from one such volume to another; the value of such conductivities being essentially that representative of the intrinsic conductivity of the semiconductor itself. In all respects the operation of the FIGURE 2 embodiment is thus similar to that described in connection with FIGURES 1 and 5; however the fabrication techniques have to a considerable extent been simplified.

In FIGURE 6 a sectioned partial view is shown of a modification of the present apparatus which adapts the device to use where the input is itself in the form of a latent electrostatic image rather than an optical image. In the simplest case the modification is achieved by merely applying to the alternating segments 15 and 17 of FIGURE 1 an insulating layer 61. The main requirements for layer 61 is that it be highly insulating in nature so that it may retain a charge image applied thereto for a long period of time, and that in addition it be quite thin so that the electric field emanating from such a deposited charge image may readily penetrate the field-effect material comprising segments 15. A layer meeting these requirements may be readily established by depositing over sections 15 and 17 a several micron layer of silicon monoxide, silicon dioxide, calcium fluoride, or the like.

In the embodiment of FIGURE 6 the charge image is directly formed upon insulating surface 61 and accordingly the photoconductive properties of the semiconductor constituting segments 15 become relatively inconsequential. Thus, while the zinc oxide composition previously identified may be utilized in the FIGURE 6 embodiment, other materials, such as for example cadmium sulfide, zinc sulfide, or many of the numerous other materials listed at page 9 of the Wallmark and Johnson reference previously mentioned, may be utilized as well. The latent charge image itself may be established upon the surface of layer 61 by any convenient method known in the art; thus, where the surface is enclosed within a suitable vacuum chamber direct electron deposition may be utilized. Alternatively, charge transfer techniques of the type known under the acronym "TESI" (transfer of electrostatic images) may be utilized. The latter techniques are fully described in numerous patents including U.S. Patent 3,060,432, and generally involve positioning of the charge receiving surface opposite a shaped electrode which is thereafter raised to sufficient potential to effect a discharge across the gap separately electrode and charge receiving surface. The important point to appreciate in connection with the FIGURE 6 embodiment is that once such a charge image is established upon the surface of layer 61 a corresponding potential distribution is created in the pin matrix 4 that will last for so long as the latent image itself. Thus a single latent electrostatic image may be utilized to produce multiple output copies or the like by the same techniques as were described in connection with FIGURE 5, that is to say by directly developing an image at surface 11, thereafter transferring to a receiving sheet and so forth.

While the present invention has been particularly described in relation to embodiments utilizing parallel coplanar strips for the paired areas—elements of which abut individual conductive pins—yet it will be appreciated by those skilled in the art that numerous modifications of the geometry described are possible without departing from the scope of the present teaching. For example, in FIGURE 7 an embodiment of the invention is partially sectionally illustrated which is in most respects identical to the FIGURE 1 showing; however, it will seem that adjacent paired strips 15 and 17 are no longer coplanar, but rather are set with respect to each other so as to form a beveled indentation in the surface 31 of the device. This latter type of geometry can in some instances be advantageous in that where optical projection is used to provide an input normal to the device, greater resolution is obtainable in the rastered latent charge image in that it is the projection of the elements 15 upon a transverse plane in the apparatus that forms individual line members of the raster and such projections, will obviously be of considerably narrower width than the elements 15 themselves where such elements are set at oblique angles with respect to the planes of projection similarly other geometries are utilizable in the present invention such as checkerboard arrangements and so forth. Accordingly, the present disclosure is to be broadly construed and limited only by the scope and spirit of the claims now appended hereto.

What is claimed is:

1. Apparatus for establishing potential variations in a pin matrix in accord with an optical input supplied to said apparatus comprising:

(a) a semiconductor field effect layer divided into paired adjacent areas, the first member of each of said pairs being responsive to light impinging thereon by dissipating previously deposited charge in accordance with the intensity of said light, whereby a charge pattern may be established on the totality of said first member areas in accord with said optical input pattern and whereby conductivity variations may be established in the semiconductor volumes underlying said first member areas in accord with said optical input;

(b) a matrix of conductive pins, individual pins being electrically connected to the boundaries between said paired areas;

(c) means to establish an electrical potential between members of said pairs whereby each of said pins apears electrically at the division point of a voltage divider circuit including in series connection a conductive channel in said first member area displaying fixed conductivity representative of the intrinsic conductivity of said semiconductor and a conductivity channel in said second member area displaying conductivity in accord with the charge pattern thereon, whereby the electrical potential of individual of said pins varies in accord with the conductivity of said first member areas and thus in accord with said optical input.

2. Apparatus according to claim 1 wherein said field effect layer comprises a storing semiconductor.

3. Apparatus according to claim 2 further including light occlusion covering said second member areas.

4. Apparatus according to claim 2 wherein said storing semiconductor comprises zinc oxide.

5. Apparatus for establishing potential variations in a pin matrix corresponding to the electric field imposed by a latent electrostatic image comprising:

(a) a control surface adapted to receive said latent electrostatic image;

(b) an image input layer adjacent said control surface and divided into a plurality of paired adjacent sections, the first member at least of each of said pairs comprising a field-effect semiconductor whereby the conductivity exhibited by said first member section varies in accord with said field, the second members of said pair being adapted to exhibit conductivity levels essentially constant among the plurality of said second members;

(c) a matrix of conductive pins, individual pins being electrically connected to the boundaries between said paired areas;

(d) means to establish an electrical potential between members of said pairs whereby each of said pins appears electrically at the division point of a voltage divider circuit including in series connection a conductive channel in said first member section displaying conductivity in accord with the said field intensity at said first section, and a conductivity channel in said second member section having a fixed resistance value, whereby the electrical potential of individual of said pins varies in accord with the conductivity of said first member areas and thus in accord with the electric field imposed by said latent electrostatic image; and (e) support means for said image input layer and said conductive pin matrix.

6. Apparatus according to claim 5 wherein said control surface bounds an insulating layer positioned against said image input layer.

7. Apparatus according to claim 5 wherein said field-effect semiconductor is further a storing semiconductor and said control surface bounds said image input layer.

8. Apparatus according to claim 7 wherein said storing semiconductor comprises zinc oxide.

References Cited

UNITED STATES PATENTS

| | | | |
|---|---|---|---|
| 2,547,386 | 4/1951 | Gray | 328—123 |
| 3,235,874 | 2/1966 | Boyd | 346—74 |

TERRELL W. FEARS, *Primary Examiner.*

LEE J. SCHROEDER, *Assistant Examiner.*

U.S. Cl. X.R.

96—1; 340—173; 346—74